United States Patent [19]

Soderholm

[11] 3,835,356
[45] Sept. 10, 1974

[54] SYSTEM FOR OPERATING THREE-PHASE INDUCTION MOTOR UNDER BALANCED CONDITIONS FOR CHANGING LOADS

[75] Inventor: Leo H. Soderholm, Ames, Iowa

[73] Assignee: The United States of America as represented by the Secretary of Agriculture, Washington, D.C.

[22] Filed: Apr. 23, 1973

[21] Appl. No.: 353,369

[52] U.S. Cl. .................................. 318/221 R
[51] Int. Cl. .................................... H02p 1/44
[58] Field of Search ............... 318/220 R, 221 R

[56] References Cited
UNITED STATES PATENTS

| | | |
|---|---|---|
| 2,423,348 | 7/1947 | Short .......................... 318/220 R |
| 2,832,925 | 4/1958 | Koll et al. ..................... 318/221 R |
| 3,122,693 | 2/1964 | Hermansdorfer ............. 318/221 R |
| 3,163,810 | 12/1964 | Schaefer ........................ 318/221 R |

Primary Examiner—Gene Z. Rubinson

[57] ABSTRACT

Improvements are made to an autotransformer-capacitor static phase converter for energizing a three-phase induction motor from a single-phase source which enable the motor to operate under balanced conditions for various loads. The amplitude of the derived phase voltage is changed to equalize the voltage of the two other phases, and the capacitance in the derived phase is increased as a function of load current.

7 Claims, 2 Drawing Figures

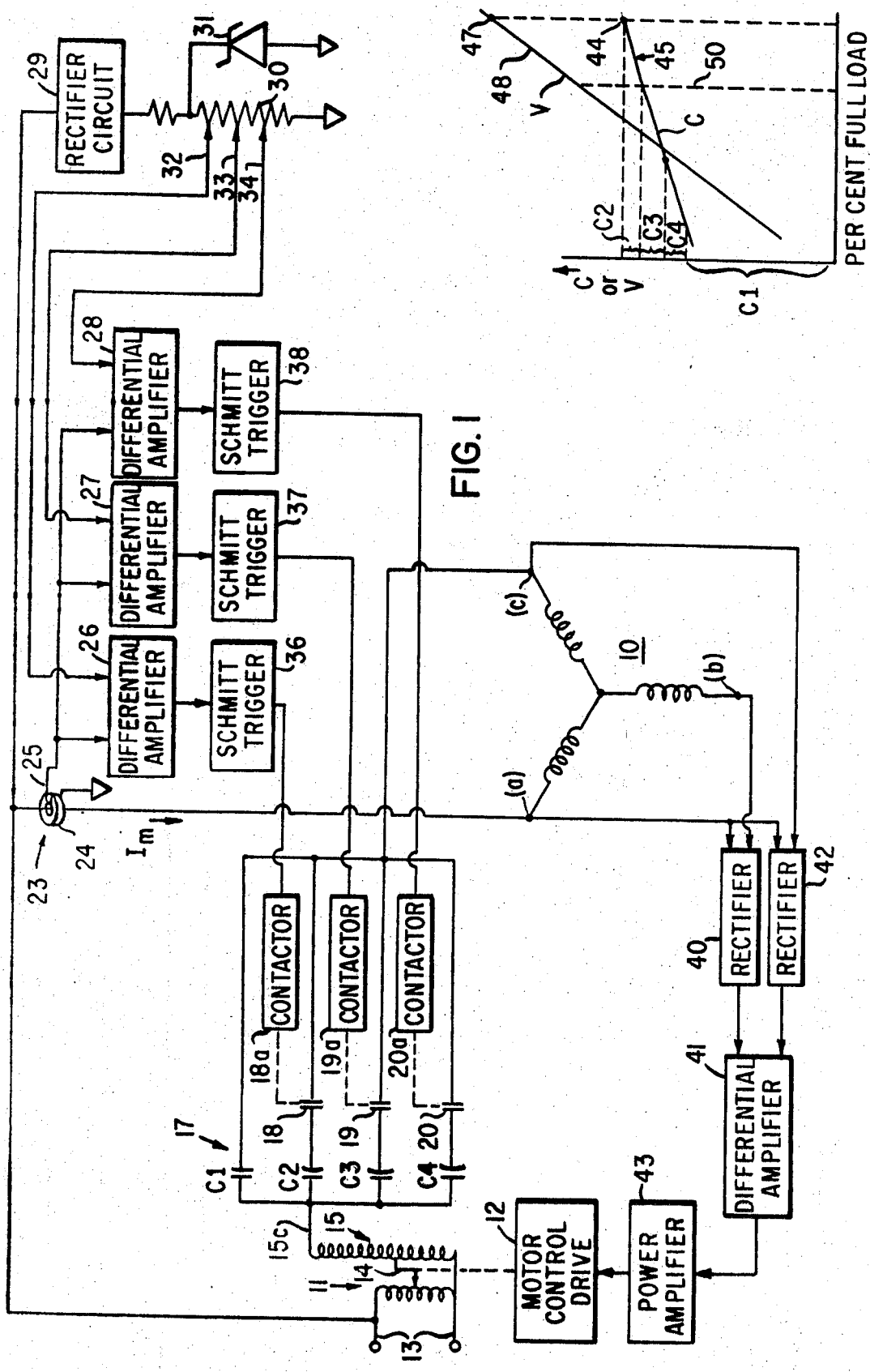

SYSTEM FOR OPERATING THREE-PHASE INDUCTION MOTOR UNDER BALANCED CONDITIONS FOR CHANGING LOADS

BACKGROUND AND SUMMARY

The present invention relates to a system for operating a three-phase induction motor from a single phase source, such as the ordinary single phase, 60 Hz., 115/230 v. source that is supplied by a utility. A three-phase induction motor is a very common and economical type of motor in the power ranges above five horsepower. In most industrial and highly urbanized areas, 60 Hz. power is supplied either in three phases or in two phases, from which a third phase may easily be provided. In other areas of the country, however, particularly in rural areas, only a single phase may be available; and it has been the practice to employ a phase converter to permit the use of single-phase power to energize three-phase motors.

Phase converters may be classified into one of three generally available types: capacitor, autotransformer-capacitor and rotary. Converter-motor combinations employing such converters are used for numerous applications, such as grain drying, pumping water for irrigation, and for feeding systems.

In the autotransformer-capacitor type of static phase converter, the single-phase supply voltage is connected to the primary winding of the autotransformer, and the two additional motor phases are produced from the stepped-up output of the autotransformer connected in series with a capacitor. The output of the autotransformer is sometimes called the "derived" or "artificial" phase since the capacitor causes a phase lead relative to the source. The amplitude of the derived phase affects the amplitude and phase of the two artificial motor phases. In conventional systems a starting capacitor is connected in parallel with a running capacitor during starting, and when the motor has achieved a predetermined speed, the starting capacitor is disconnected.

The principal advantages of the autotransformer-capacitor phase converter is its simplicity, reliability and lack of moving parts. However, it has a disadvantage in that the motor currents become unbalanced as the motor loading deviates from any condition other than that for which the phase converter parameters have been set in order to achieve balanced phase voltages to the motor. In other words, if motor loading is varied, the current flowing in each phase will be different and the power factor will change. The currents and voltages become "unbalanced", thereby causing motor vibration due to the negative sequence components of load current circulating in the motor. Such unbalanced conditions increase the motor heating and, in combination with the resulting vibration, shorten the life of the motor.

The system of the present invention employs a static autotransformer-capacitor phase converter for supplying three-phase energy to an induction motor from a single-phase source. Circuitry is employed for sensing the terminal voltage at each of two phases and for comparing these voltages to generate an error signal representative of the difference in amplitude between the two phases. This error signal controls the amplitude of one of the phase voltages to cause the two sensed phase voltages to be equal. In addition, circuitry is included for sensing the load current of the motor and for switching additional capacitors in parallel with the main or running capacitor as load current increases, thereby maintaining the proper phase relationship for the current of the artificial phase and achieving a better balance. The values of capacitance added and amplitude of the artificial phase voltage depend upon the particular application and the motor design; and as many values of individual capacitors as are desired may be used in order to achieve a smooth fitting of the plot of capacitance vs. load.

In addition to achieving a more balanced operation for the induction motor over a much wider range of load current than has heretofore been achieved for systems of this type, the present invention provides that when the motor current is highest, the maximum value of capacitance will be inserted in the circuit; and this aids in starting the motor.

Other features and advantages of the present invention will be apparent to persons skilled in the art from the following detailed description of a preferred embodiment accompanied by the attached drawing.

THE DRAWING

FIG. 1 is a circuit diagram, partially in schematic form and partially in functional block diagram form, of a system incorporation the present invention; and FIG. 2 is an idealized plot showing the relationship of necessary voltage and capacitance for the artificial phase as a function of full load which are necessary to achieve a completely balanced operation.

DETAILED DESCRIPTION

Referring first to FIG. 1, reference numeral 10 generally designates a three-phase induction motor, the terminals of which are designated respectively a, b and c. A motor driven variac is designated 11, and the driving motor is shown by the functional block 12.

The input terminals 13 of the primary winding of the variac 11 are connected to a single-phase, 60 HZ. source of power. The variac 11 includes a movable output arm 14 which is connected to one terminal of the primary winding of an autotransformer 15; and one terminal of the variac 11 and one terminal of the autotransformer 15 are connected in common, as illustrated. The other terminal of the input winding of the variac is connected to terminal a of the induction motor 10. The other terminal (which may be ground) of the primary winding of the variac 11 (namely, the one which is connected in common with the autotransformer 15) is connected to terminal b of the induction motor 10, the windings of which are connected in Y array.

The other secondary terminal of the output of the autotransformer 15, labelled 15c is connected by means of a bank of capacitors 17 to the terminal c of the induction motor 10. The bank of capacitors 17, for the illustrated embodiment, comprises four separate capacitors designated C1, C2, C3 and C4 respectively, all having one terminal connected in common. The other terminal of each of the capacitors C2, C3 and C4 are connected respectively to normally open contacts 18, 19 and 20 which are, in turn, actuated respectively by contactors 18a, 19a and 20a. The other terminal of the normally open contacts 18–20 are connected in common and to the terminal c of the motor 10.

The current sensor generally designated 23 including a core 24 is arranged to sense the current, $I_m$, flowing into the terminal a of the motor 10. Thus, the output terminal 25 of the current sensor 23 carries a voltage reresentative of motor current, $I_m$. This signal is fed to one input terminal to three separate differential amplifiers designated 26, 27 and 28 respectively.

The input voltage is also fed to a rectifier circuit 29, the output of which feeds a voltage divider resistor 30 across which a Zener diode 31 is connected to insure that the voltage across the voltage divider resistor 30 is independent of fluctuations in source voltage. There are three separate wiper arms 32, 33 and 34 associated with the voltage divider resistor 30 for generating voltages of different values, each value representative of a predetermined value of motor current; and these voltages are fed respectively to the other input terminals of the different amplifiers 26–28. Each of the differential amplifiers 26–28 may be of conventional design, and it generates an output signal of one polarity when the voltage on one input terminal is greater than that on the other; and the polarity reverses when this relationship changes. Each of the differential amplifiers 26–28 is arranged to generate an output signal of a known polarity when the voltage signal from the current sensor 23 is greater than the signal at its other input terminal which is received from the voltage divider network 30.

The output signals of each of the differential amplifiers 26–28 are fed respectively to Schmitt trigger circuits 36, 37 and 38, the output signals of which feed respectively the contactors 18a, 19a and 20a. The Schmitt trigger circuits 36–38 may be of conventional design, and they generate an output signal whenever the input voltage exceeds a predetermined threshold value. For example, whenever the current sensed by the device 23 is greater than the voltage signal at the tap 34 of the voltage divider network 30, the differential amplifier circuit 28 will generate an output signal of a known polarity which, in turn, will cause the Schmitt trigger circuit 38 to generate an output signal which will energize the contactor 20a, thereby closing the contacts 20 and connecting capacitor C4 in parallel with capacitor C1. As the load current $I_m$ increases to a second predetermined value represented by the voltage at the tap 33 of the voltage divider network 30, the differential amplifier 37 will generate a signal to cause the Schmitt trigger circuit 37 to generate an output pulse which will close the contacts 19. It will thus be appreciated that as the load current increases, the total capacitance of the bank 17 will increase correspondingly and according to a predetermined design. Obviously, as many of the separate capacitor channels may be included as are necessary for a given design.

The motor terminal voltage $V_{ba}$ is fed to a rectifier circuit 40, the output of which is fed to a first input terminal of a differential amplifier 41. The motor terminal voltage $V_{ac}$ is fed to a second rectifier 42, the output of which feeds the other input terminal of the differential amplifier 41. The differential amplifier 41 may be of a design similar to that discussed in connection with the amplifiers 26–28. That is to say, if the two input voltages are equal, the output voltage of the differential amplifier 41 is zero volts. If one input terminal has a voltage greater than the other, the output of the differential amplifier is one polarity, and if the magnitude of the voltages at the input terminals is reversed, the polarity of the output signal is reversed. The output of the differential amplifier 41 feeds a power amplifier 43 which, in turn, feeds the motor control drive 12 to vary the wiper arm 14 of the variac 11. In operation, if the voltage $V_{ba}$ is equal to the voltage $V_{ac}$, the wiper arm 14 remains unchanged. If the voltage $V_{ac}$ is less than the voltage $V_{ba}$, then the differential amplifier 41 will generate a voltage of one polarity to raise the output voltage at the secondary of the autotransformer 15. If the voltage $V_{ac}$ is greater than the voltage $V_{ba}$, then the differential amplifier 41 will generate an outut voltage of reverse polarity, moving the wiper arm 14 in the opposite direction to lower the output voltage at the terminal 15c of the autotransformer 15.

In operation, when the motor 10 is first turned on, there will be a large inrush of motor current $I_m$, and the signal generated by the current sensor 23 will be correspondingly greater than the voltage generated by the highest tap 32 of the voltage divider resistive network 30. Hence, all of the differential amplifiers 26–28 will generate output signals to cause the contactors 18a–20a to close their associated contacts 18–20, thereby connecting all of the capacitors C1–C4 in parallel to achieve maximum starting capacity in the artificial phase. The wiper arm 14 of the variac 11 may be set at a nominal starting voltage. When the motor is operating at full load, all of the capacitors C1–C4 continue to be connected in parallel, this corresponds to the operating point 44 on the curve 45 in FIG. 2, which represents the value of capacity needed to achieve balanced phase currents in the motor 10 as a function of load current. At the same time, the voltage across the output of the autotransformer 15 will be determined by the value 47 on the curve 48 which defines the relationship between the amplitude of the artificial phase voltage and the load current in order to achieve balance. As the load current diminishes, the feedback network including the differential amplifier 41 and motor-driven variac 11 will maintain the phase voltages at equal but diminishing values. When the load current falls to the value indicated by reference numeral 50 in FIG. 2, the output voltage of the differential amplifier 26 will fall beneath the threshold necessary to actuate the Schmitt trigger circuit 36, and the contactor 18a will be de-energized and the contacts 18 open, thereby removing capacitor C2 from the circuit. Operation will continue in this manner as a function of the load circuit. In some cases, it may be desirable to introduce some time delay in the feedback loop which includes the motor control drive 12 in order to avoid hunting. This may be accomplished by a separate delay circuit such as a delay line or delay may be designed into the differential amplifier 41.

Having thus described in detail a preferred embodiment of the present invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In a static phase converter for supplying a three-phase voltage to an induction motor from a single-phase voltage source including an autotransformer for generating an artificial phase voltage and first capacitor means connected in circuit with said artificial phase and one terminal of said motor, an improvement for balancing the phase currents during normal operation as the load on said motor changes, said improvement comprising: current sensing means for generating a signal representative of the normal operating load current in said motor; second capacitor means adapted to be connected in parallel with said first capacitor means; comparison circuit means responsive to said load current signal for connecting said second capacitor means in parallel with said first capacitor means when said normal operating load current signal exceeds a predetermined value; and feedback circuit means responsive to two of the phase voltages of said motor for changing the magnitude of said voltage of said artificial phase to cause said sensed phase voltages to be equal during operation of said motor and as a function of the load on said motor.

2. The system of claim 1 further comprising third capacitor means adapted to be connected in parallel with said first capacitor; and third comparison circuit means responsive to said load current signal for switching said third capacitor in series with said first capacitor when said load current signal exceeds a second predetermined value higher than said first predetermined value of load current.

3. The system of claim 1 wherein said feedback circuit means comprises first circuit means for generating a signal representative of one phase of the three phases of voltage energizing said motor; second circuit means for generating a signal representative of the amplitude of the second phase voltage fed to said motor; comparison circuit means responsive to said signals representative respectively of the magnitudes of said first and second phase voltages; and means for varying the input voltage of said autotransformer in response to said comparison circuit means.

4. In a static phase converter for supplying a three-phase voltage to an induction motor from a single-phase source, a first phase being derived from the secondary of said autotransformer and further including a capacitor connected in series with said first phase voltage, the improvement comprising: A plurality of additional capacitors adapted to be connected in parallel with said first capacitor; circuit means responsive to normal operating load currents for individually connecting each of said plurality of capacitors in parallel with said first capacitor at predetermined levels of increasing load current during normal operation of said motor; and control means for varying the amplitude of said first phase voltage during normal operation under varying loads to equalize the magnitude of voltages at said induction motor.

5. The system of claim 4 wherein said control means includes a variable voltage transformer having its variable output lead connected across the primary of said autotransformer, one of said first and second phases being derived from the primary of said variable voltage transformer and the other of said first and second phases being derived between the terminal common to the autotransformer and the primary of said variable transformer, and the output terminal of said autotransformer.

6. The apparatus of claim 5 wherein said control means further comprises comparison circuit means sensing the voltage at said first and second phases to vary the output voltage of said variable transformer means to equalize the magnitude of voltage at said first and second phases.

7. A method of equalizing the phase currents in a three-phase induction motor energized by a single phase source by means of a statis autotransformer-capacitor converter during normal operation of said motor, comprising: sensing the operating load current in said motor; increasing the value of series capacitance in said converter with increasing operating load current during normal operation with varying load; comparing the amplitude of voltages at two phases of said motor; and changing the amplitude of the voltage at the third phase to cause the amplitudes at said first and second phases to be equal as normal operating loads on said motor vary.

* * * * *